Figure 1A:
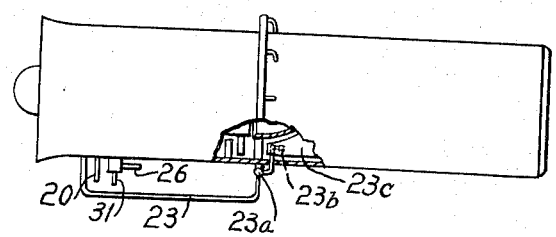

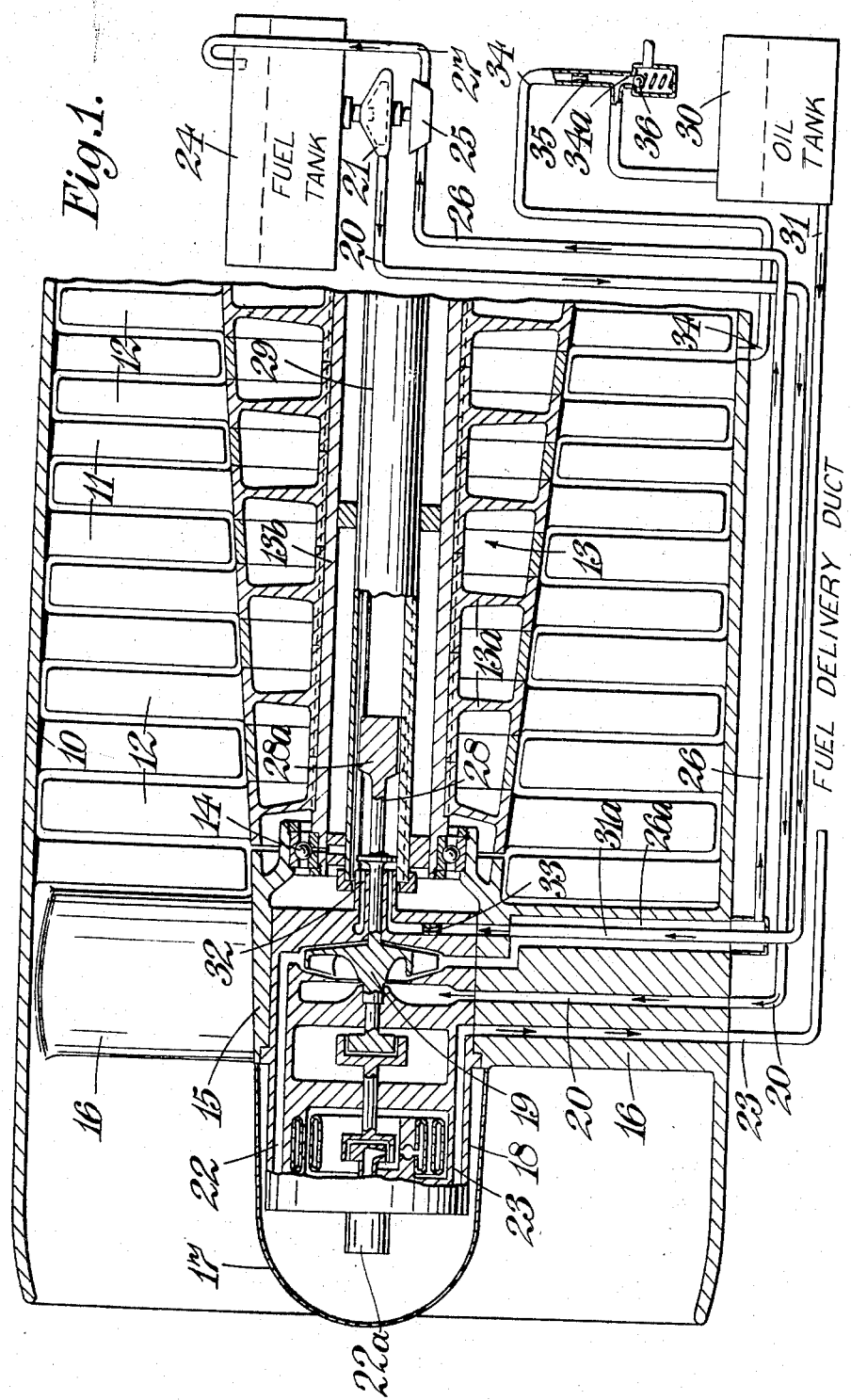

United States Patent Office 2,761,281
Patented Sept. 4, 1956

2,761,281

LUBRICATING SYSTEM WITH OIL FLOW CONTROL FOR GAS TURBINE ENGINES

Cyril Armer, Chellaston, near Derby, England, assignor to Rolls-Royce Limited, Derby, England, a British company Application January 3, 1955, Serial No. 479,497

Claims priority, application Great Britain February 18, 1954

6 Claims. (Cl. 60—39.08)

This invention relates to lubricating systems for gas turbine engines, and is particularly concerned with lubricating systems of the kind in which the lubricating oil after passing to the elements to be lubricated is exhausted to atmosphere, into a working fluid passage of the engine, or to some other convenient location, and is not returned to the source from which the oil is fed to the engine. Such a lubricating system will be referred to as "a lubricating oil system of the non-scavenged type."

In a lubricating oil system of the non-scavenged type, it is desirable that the rate of flow of lubricating oil to the elements to be lubricated shall be closely metered under all conditions of operation, and in particular that large changes in the rate of flow shall not occur on variation of the ambient atmospheric temperature, so that the elements are not starved of lubricating oil under certain conditions and on the other hand so that the rate of flow is not wastefully large under other conditions of operation.

It is an object of the present invention to provide a lubricating oil system which meets this requirement, and is also simple and light in weight.

Accordingly the present invention provides a lubricating oil system of the non-scavenged type for a gas turbine engine, comprising a source of oil under pressure, conduit means to convey the oil from the source to be distributed in the engine, a restrictor in said conduit which is effectively of the sharp-edged type in said conduit, and heating means associated with said conduit immediately upstream of said restrictor to heat the oil passing through the restrictor at least to a predetermined temperature above which the change in viscosity of the oil on change of temperature is small, whereby the change in the rate of flow of oil for a given pressure difference across the restrictor is maintained within desired narrow limits.

In accordance with a preferred feature of the invention, the restrictor is a simple fixed-area restrictor. It is arranged that the size of the restrictor in relation to the bore of the conduit is such that for a given delivery pressure the rate of flow of oil is determined substantially wholly by the restrictor.

Preferably the source of oil under pressure comprises an oil tank or sump which is arranged to be pressurized to a substantially constant pressure during operation. For example, the oil tank or sump may be pressurized by air compressed in the compressor of the engine, the pressure in the tank being controlled by a relief valve set at a small differential above atmospheric pressure.

In accordance with another feature of the invention, the heating means may comprise a heat-exchanger device fed with air compressed in a compressor of the engine or with fuel which while being pressurized in a fuel pump of the engine, has been heated due to the action of the pump.

According to a preferred arrangement of the present invention, there is provided the combination with a gas turbine engine fuel supply means which includes an engine-driven centrifugal fuel pump connected to deliver fuel to the main combustion equipment of the engine and wherein, owing to the reduction of the rate of fuel flow from the pump to the combustion equipment with increase of altitude at a given rotational speed of the engine, the temperature of the fuel delivered by the pump increases with increase of altitude, of a lubricating oil system of the non-scavenged type which comprises an oil tank, conduit means to convey the oil from the tank to be distributed in the engine, means to feed the oil from the tank to the conduit at substantially constant pressure, restrictor means in said conduit, and a heat exchange device in said conduit upstream of said restrictor wherein the oil flowing from the tank to the engine is passed in heat exchange relation with fuel delivered by said centrifugal pump.

The heat exchange device may conveniently be a jacket surrounding the oil flow conduit and fed with fuel from the delivery of the pump. The jacket may form part of the fuel delivery line from the pump to the combustion equipment, or it may form part of a spill line which is connected to the delivery of the pump and through which fuel is, for example, allowed to return to the fuel tank.

One embodiment of a lubricating system according to this invention will now be described with reference to the accompanying drawings of which—

Figure 2C:
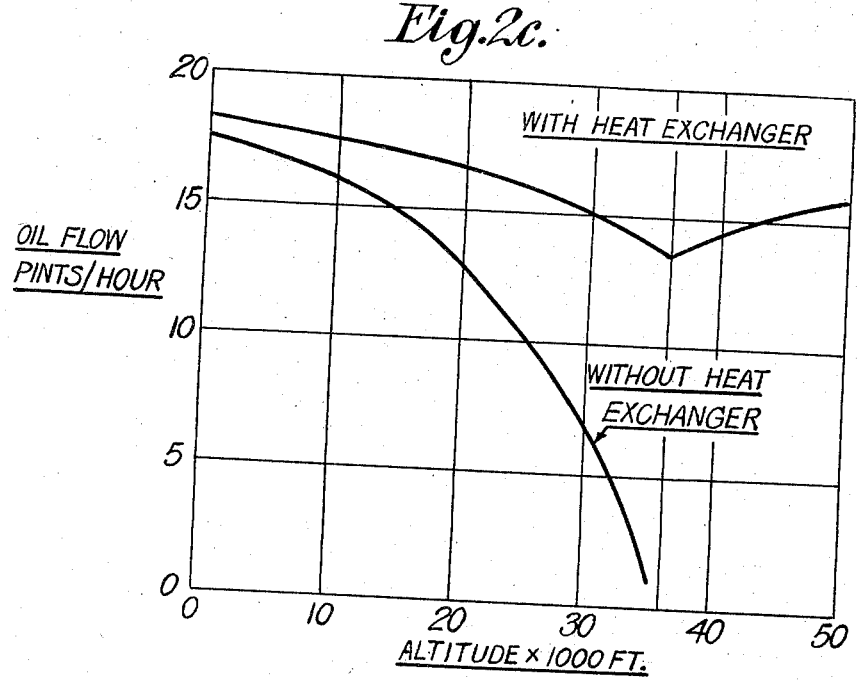
Figure 2A:
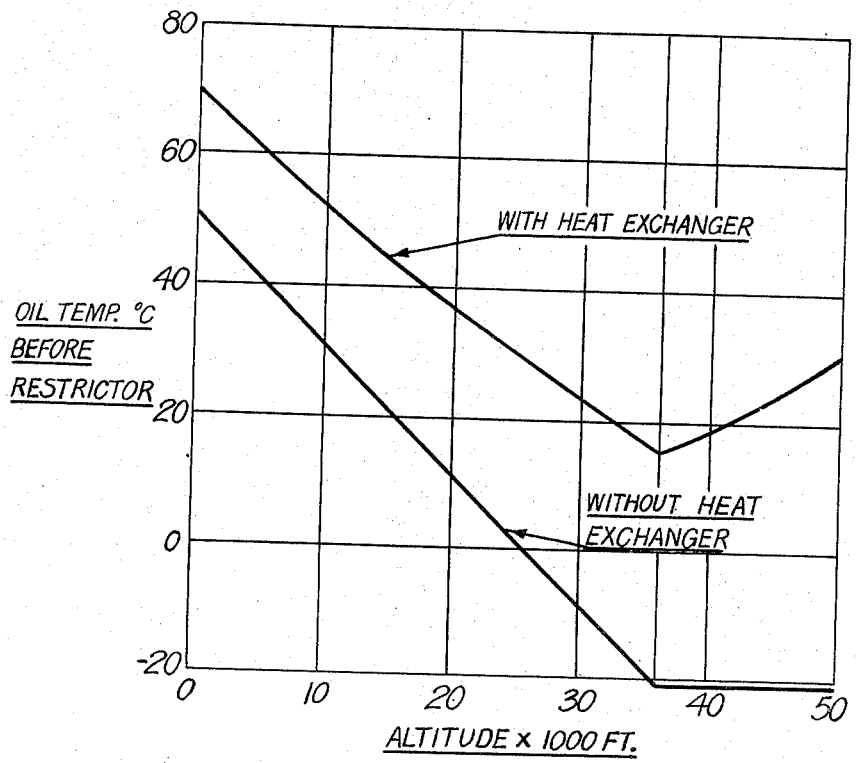
Figure 2B:
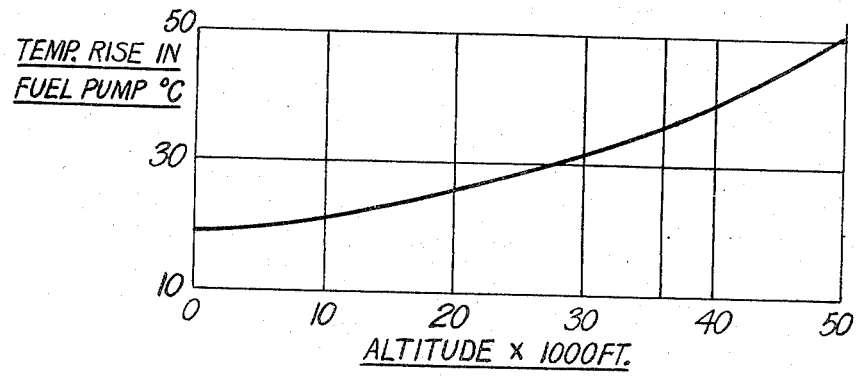

Figure 1 shows the compressor end of a gas-turbine engine, parts of the engine being in section, together with part of the fuel supply system and the lubricating oil system, Figure 1a illustrates diagrammatically a gas turbine engine, parts being broken away to show the combustion equipment, and Figures 2a, 2b and 2c are graphs showing certain characteristics of the systems.

Referring to the drawing, the compressor comprises an outer casing 10 supporting a number of rows of stator blading 11, which alternate with rows of rotor blading 12 mounted on a rotor drum structure 13.

The rotor drum structure 13 comprises a number of discs 13a mounted on a hollow shaft 13b, the shaft being mounted in bearings, one, 14, of which is shown. The bearing 14 is supported in a housing 15 which also forms part of the inner wall of the air intake to the compressor and the housing 15 is supported from the outer casing 10 by struts 16 which extend across the air intake.

The housing 15 also accommodates part of the engine fuel system and carries at its forward end a nose cap 17 which together with the leading portion of the outer casing 10 affords the boundary of the air intake of the compressor.

The part of the engine fuel system accommodated within the housing 15 includes a pump-and-throttle casing 18 wherein is accommodated a centrifugal pump including an impeller 19 and having an inlet duct 20 which extends from a fuel booster pump 21 through one of the struts 16 to the pump-and-throttle casing 18, and having a delivery duct 22 leading to the throttle 22a which is accommodated in the forward part of the casing 18 and thence to a delivery duct 23 which extends through one of the struts 16 to externally of the compressor and then leads to a manifold 23a (Figure 1a) feeding the fuel injectors 23b in the engine combustion equipment 23c.

The booster pump 21 is located close to a fuel tank 24 and draws fuel from the fuel tank to deliver it into the duct 20. The pump 21 is driven by a hydraulic motor 25, such as a turbine, and the liquid employed for operating the turbine 25 is fuel taken from the delivery of the fuel pump 19 through a spill duct 26. The fuel leaving the turbine 25 is returned to the fuel tank through a pipe 27.

The centrifugal impeller 19 is driven through a quill shaft 28 which at its end remote from the impeller has an enlarged head 28a splined to engage with web-like features in an oil distributor tube 29 of an oil distributing system which is conveniently of the form described in United States Patent No. 2,712,967 (P. Sutton, assignor to Rolls-Royce Limited) granted July 12, 1955. The distributor tube 29 is connected to and rotates with the compressor shaft 13b.

The lubricating system is of simple design and is arranged so that a substantially constant rate of delivery of lubricating oil is obtained to the distributor tube 29.

The lubricating system comprises a closed oil reservoir or tank 30 with an oil delivery line 31 which extends through one of the struts 16 to a nozzle 32 by which the lubricating oil is delivered into the distributor tube 29. The line 31 contains a restrictor 33 which is effectively of the sharp-edged type and which controls the rate of flow of oil from the tank 30. The tank 30 is arranged to be pressurized by air tapped off from the compressor through a pipe 34 leading from the compressor casing 10 to the tank 30. The pipe 34 has fitted in it a restrictor 35 which limits the quantity of air tapped off from the compressor and downstream of the restrictor 35 there is provided a relief valve 36 which is fitted in a branch 34a from the pipe 34. The relief valve acts to maintain the pressure in the oil tank 30 at a value which is a small, substantially constant amount, say 5 lbs./sq. in., above atmospheric pressure.

In order to ensure that the temperature of the lubricating oil is at least a predeterminable temperature above which the change in viscosity of the oil with change of temperature is small, and thus the rate of flow of oil is substanitally unaffected by change of the temperature, the oil delivery line 31 has a part thereof 31a enclosed in a jacket 26a which is formed by a part of the spill duct 26 through which fuel is taken from the fuel pump to the turbine 25 for driving the boster pump 21. In operation of the gas-turbine engine, the fuel temperature on the delivery side of the centrifugal impeller 19 will normally be above about 20° C. and thus with lubricating oils as commonly used in gas-turbine engines the rate of flow of lubricating oil from the pressurized tank 30 through the restrictor 33 will be substantially unaffected by changes of temperature of the oil.

Furthermore, it has been found that when a non-positive-displacement pump, such as the centrifugal pump 19, has its rate of delivery reduced at a constant rotational speed, recirculation of the fuel occurs in the pump and the temperature of the fuel at outlet from the pump is increased. Now, an engine fuel pump is normally designed to deliver the maximum quantity of fuel required by the engine at sea level, and therefore, since the mass flow of air drawn in by the engine at a constant rotational speed is reduced as the operational altitude increases, the rate of delivery of fuel from the pump must be correspondingly reduced. Consequently with a pump such as pump 19, the fuel delivery temperature will increase with increase of altitude, and since the temperature of the oil in tank 30 tends to fall with increase of altitude, due to the decrease of ambient temperature in the troposphere, the heat exchange device 26a, 31a may be arranged so that the two effects substantially balance one another and the temperature of the oil immediately prior to flowing through the restrictor 33 may be maintained substantially constant, or within a desired range.

In one example, the oil known as E.E.L.3, when delivered through a selected orifice by a delivery pressure of 5 lbs./sq. in. gauge, flows at the rate of 14½ to 19 pints per hour provided the temperature is above about 20° C., the mean flow of 16.75 pints per hour being obtained at about 40° C.

There are shown in Figures 2a, 2b and 2c certain characteristics which have been estimated for a lubricating oil system having a heat exchange device in accordance with the invention compared with a similar system without such a heat exchanger. The traces shown in the figure are based on the use of the oil known as E.E.L.3 and of a pressure difference across the restrictor of 5 lbs./sq. in., and are plotted for a constant flight speed of 600 M. P. H. at each altitude.

In Figure 2a the lower trace represents the ram air temperature, that is at the ambient atmospheric temperature plus the temperature due to the motion of the aircraft. It is assumed that this corresponds to the temperature which the oil would attain when no heat exchanger is used. In Figure 2b there is shown the rise of temperature of the fuel passing through the fuel pump, and it will be seen that this rise increases with increase of altitude due to the reduction of the rate of fuel flow to the engine. This curve is for a constant rotational speed of the engine. The upper trace in Figure 2a represents the temperature which the oil attains after passing through the heat exchanger 26a, 31a; it is assumed that, due to the rate of flow of oil being small compared with the rate of flow of fuel through the pipe 26, the temperature of the oil at outlet from the heat exchanger is equal to the fuel temperature at outlet from the pump.

In Figure 2c there are shown the rates of flow of oil with and without the heat exchanger, corresponding to the oil temperatures shown in Figure 2a. It will be noted that there is a discontinuity in the curve of oil flow which corresponds to the discontinuity in the curve of ambient atmospheric temperature against height i. e., the tropopause. It will also be more particularly noted that over the greater part of the range of heights shown the fuel temperature on the delivery side of the centrifugal impeller, and thus the oil temperature at inlet to the restrictor, is above about 20° C., and that with this arrangement the rate of oil flow is substantially constant and only varies between about 13 and 18 pints per hour. However, it will be seen that a similar oil system without such a heat exchanger results in an oil flow which falls off rapidly with increasing height and becomes undesirably low above about 30,000 feet.

I claim:

1. A gas turbine engine comprising a compressor, main combustion equipment connected to receive air compressed in said compressor, a bearing, fuel supply means which inclues an engine-driven centrifugal fuel pump connected to deliver fuel to said combustion equipment and wherein, owing to the reduction of the rate of fuel flow from the pump to the combustion equipment with increase of altitude at a given rotational speed of the engine, the temperature of the fuel delivered by the pump increases with increase of altitude, and a lubricating oil system of the non-scavenged type which includes an oil tank, conduit means to convey the oil from the tank to said bearing of the engine, means to feed the oil from the tank to the conduit at substantially constant pressure, restrictor means in said conduit, and a heat exchange device in said conduit upstream of said restrictor wherein the oil flowing from the tank to the engine is passed in heat exchange relation with fuel delivered by said centrifugal pump.

2. The combination according to claim 1, wherein the heat exchange device is a jacket surrounding the oil flow conduit and fed with fuel from the delivery of the pump.

3. The combination according to claim 2, wherein the jacket forms part of the fuel delivery line from the pump to the combustion equipment.

4. The combination according to claim 2 wherein the jacket forms part of a spill line from the delivery of the pump.

5. A lubricating oil system as claimed in claim 1, wherein the means to feed oil from the oil tank comprises means to pressurize said oil tank to a substantially constant pressure during operation.

6. A lubricating oil system as claimed in claim 5, wherein the means to pressurize the said oil tank comprises a connection from the compressor of the engine to the oil tank conveying air compressed in the compressor to the oil tank, and a pressure relief valve set at a small differential above atmospheric pressure and connected to the tank to control the pressure therein.

References Cited in the file of this patent

UNITED STATES PATENTS 2,017,847   Bijur ------------------ Oct. 22, 1935